United States Patent Office 3,446,761
Patented May 27, 1969

3,446,761
STAIN-RESISTANT ARTICLE, AND COMPOSITION FOR PREPARING SAME
Joseph A. Antonelli, Riverton, N.J., and Murray Zanger, Havertown, Pa., assignors to E. I. du Pont de Nemours and Company, Wilmington, Del., a corporation of Delaware
No Drawing. Filed Nov. 4, 1965, Ser. No. 506,389
Int. Cl. D06m 5/38; C08f 27/02, 29/56
U.S. Cl. 260—17.4
8 Claims

ABSTRACT OF THE DISCLOSURE

A polymer latex (aqueous dispersion) which is adapted for application to fabric articles and the like by an exhaust method using ordinary home laundry equipment to render the articles stain-resistant and repellent to oil and water. The latex composition must contain (A) a certain fluorine-containing polymer (e.g. one made from hexafluoropropylene oxide dimer and hydroxyethyl methacrylate), and (B) a certain cationic copolymer of a basic acrylic monomer [e.g. 2-(diethylamino)ethyl methacrylate] and a neutral acrylic monomer (e.g., an alkyl methacrylate). The composition preferably also contains (C) a wax and (D) an auxiliary polymer. An ordinary clothes dryer and/or heated flat iron can be used to dry and cure the composition applied to the fabric articles.

---

This invention relates to a new liquid polymeric composition which is useful for treating materials (e.g. fabrics, suede, wood and paper) to render them stain-resistant and repellent to oil and water. The invention also concerns a process wherein this composition is applied to such materials, and it concerns the resulting treated articles.

The material to be treated is initially "wettable" with the liquid composition; that is, it is a material which permits the composition to cling to it in sufficient amount and uniformity during application and drying of the composition that the ability of the material to repel water and/or oil is substantially improved.

The term "treated article" herein signifies the result of impregnating, coating or otherwise applying to the material to be treated the liquid composition of this invention, followed by evaporation of the volatile components of the composition. Thus, broadly speaking, the treated article of this invention is a fabric or other material which is initially wettable with, and contains a dried deposit of, the liquid composition described in the next paragraph.

The new liquid composition of this invention, expressed broadly, consists of a dispersion in water of 100 parts by weight of nonvolatile components comprising:

(A) About 5 to 95 parts by weight of a fluorine-containing polymer having the structural formula:

$$(R^1\text{—}\underset{\underset{O}{\|}}{C}\text{—}X)_p(HX)_{m-p}\text{—}R^2$$

wherein $R^1$ is the radical

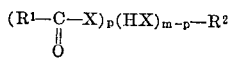

$C_3F_7$— being $F_3C$—$CF_2$—$CF_2$— or

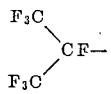

and $n$ being an integer of 0 to 6 inclusive; X is oxygen or nitrogen; $R^2$ is a polymeric radical having a valence of $m$; and $m$ and $p$ are integers of at least 1.

(B) About 5 to 95 parts by weight of a cationic polymer containing interpolymerized units of: (1) a basic acrylic monomer of the formula

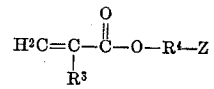

wherein $R^3$ is H or $CH_3$, $R^4$ is a 2-4 carbon atom alkylene radical or a radical of the formula

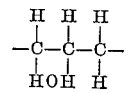

and Z is (a)

wherein $R^5$ is H or a 1-4 carbon atom alkyl radical and $R^6$ is a 1-22 carbon atom alkyl radical, or (b) a 5 or 6 membered heterocyclic radical having a secondary nitrogen atom; Z being present in ionizable salt or quaternary ammonium form, and (2) a neutral acrylic monomer of the fomula

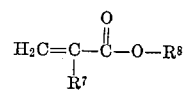

wherein $R^7$ is H or a 1-7 carbon atom alkyl radical and $R^8$ is a 1-22 carbon atom aliphatic hydrocarbon radical.

Usually the fluorine-containing polymer (A) has an $R^1$ radical content of at least 40% by weight to insure obtaining satisfactory oil and water repellent properties in the product.

The process of this invention, in a broad sense, comprises applying the liquid composition described in the previous paragraph to a fabric or other material which is initially wettable with said composition and thereafter evaporating the volatile portion of the composition applied to said material.

The fluorine-containing polymer (A) of the new liquid composition described above and the preparation of this polymer are described in copending U.S. patent application Ser. No. 505,241 filed Oct. 26, 1965 by M. Zanger; the disclosure of this copending application is incorporated herein by reference.

Polymer (A) constitutes about 5–95%, preferably about 10–90%, by weight of the nonvolatile portion of the liquid composition. In a preferred embodiment of the composition, the radical $R^1$ of polymer (A) has the formula

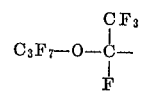

And in particularly preferred embodiments, polymer (A) has the structure which results from replacing with

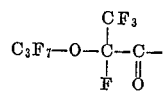

groups the H atoms of at least part of the HX-groups of a polymer from the group consisting of poly(hydroxyalkyl acrylates) and poly(hydroxyalkyl methacrylates) in which the alkyl group contains 1-8 carbon atoms, poly(vinyl alcohol), cellulose, and poly(ethylene imine).

The cationic acrylic polymer (B) can be prepared according to the procedures described in British Patent No.

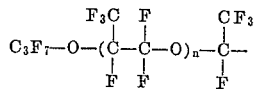

915,759, the disclosure of which is incorporated herein by reference. The basic monomer (1) where $R^4$ is a radical of the formula:

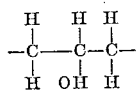

is obtained by reacting glycidyl acrylate or methacrylate with a compound capable of providing radical Z.

Since polymers (A) and (B) are present in the liquid composition in the form of an aqueous dispersion, both polymers are preferably prepared by emulsion polymerization following known general practice in this technique. The resulting separate aqueous dispersions of polymers (A) and (B) are then mixed together to form the novel liquid composition. However, the polymers can also be prepared by known bulk, solution and organosol techniques of polymerization, followed by separation of the polymers from any organic liquid that is present and dispersion of the polymers in water with the aid of a suitable emulsifying agent according to known procedures.

Polymer (B), like polymer (A), constitutes about 5–95% preferably about 10–90%, by weight of the nonvolatile portion of the composition. The weight ratio of units from the basic monomer (1) to the units from the neutral monomer (2) in polymer (B) is preferably 20:80 to 80:20.

A preferred polymer to employ as polymer (B) is a copolymer of (1) 2-(diethylamino) ethyl methacrylate and (2) an alkyl methacrylate having 1–22 carbon atoms in the alkyl group, the weight ratio of (1) to (2) being about 25:75 to 50:50.

Polymer (B) can also contain up to about 20% by weight of units from another neutral monoethylenically unsaturated monomer interpolymerized with components (1) and (2). Examples of such a monomer are acrylonitrile, methacrylonitrile, styrene, alpha methyl styrene, vinyl toluene, vinyl chloride and vinyl fluoride.

In addition to the essential polymer components (A) and (B), the liquid composition can also contain another polymer, which can be referred to as an extender polymer or auxiliary polymer. The auxiliary polymer can constitute up to 90%, preferably about 3 to 80%, by weight of the nonvolatile portion of the composition.

One skilled in the art will have no difficulty in selecting useful auxiliary polymers in accordance with the properties desired in the treated stain-resistant product. Examples of useful auxiliary polymers are those made from one or more of the following monomers: alkyl and hydroxyalkyl acrylates and methacrylates, butadiene, acrylonitrile, styrene, allyl acetate, chloroprene, vinyl acetate, vinyl chloride, vinylidene chloride, and N-methylol acrylamide.

The nonvolatile portion of the liquid composition can also contain up to 90%, preferably about 5 to 80% by weight of a water repellent wax when ease of ironing and maximum water repellence are desired in the treated article. The weight ratio of wax to polymer (B) in the composition is preferably not more than 5:1. The wax is preferably dispersed in an aqueous dispersion of polymer (B) before polymer (A) is added to the composition; for example, the wax in molten form can be slowly added to the polymer (B) dispersion while the latter is vigorously stirred. The useful waxes are exemplified by paraffin, microcrystalline wax, polyethylene and oxidized polyethylene waxes, hydrogenated castor oil, beeswax and carnauba wax.

The liquid composition can also contain various additives known to be useful in aqueous polymeric compositions, for example antistatic agents, coloring agents, curing agents, fireproofing agents, fungicides, sequestering agents, stabilizers, exhausting aids and fabric softeners.

The liquid composition is conveniently prepared as a "concentrated dispersion"; that is, having such a proportion of nonvolatile components (e.g. 4 to 12% by weight) that (a) a small amount (e.g. one pint) of the composition can be added to a load of water and fabric articles to be treated in an ordinary home-type washing machine, and (b) a sufficient quantity of nonvolatile components is deposited ("exhausted") on the articles during agitation of the load (e.g. for 1 to 30 minutes) to result in a substantial improvement in their stain-resistance and oil and water repellence.

As indicated in the previous paragraph, the liquid composition is useful for treating articles by the "exhaust" method; this means that the fabric or other article being treated extracts the nonvolatile components of the composition from the treating bath until the bath becomes substantially "exhausted" (free of nonvolatile components). Compositions of the present invention can be applied by the exhaust method to fabrics made from hydrophobic textile fibers (e.g. polyester fibers) as well as those made from hydrophilic fibers (e.g. cotton fibers).

When the composition is applied to articles by the efficient exhaust method, preferably (1) the load in the washer is at a temperature of about 40 to 170° F. when the concentrated dispersion is added; (2) the immersed articles are agitated until a major proportion (51–100%) of the nonvolatile portion of the composition is deposited thereon; (3) the weight ratio of the nonvolatile portion of the composition to the dry weight of articles in the washer is about 0.3:97.7 to 10:90; (4) the total amount of water present is about 1 to 6 gallons per pound (dry weight) of the articles being treated; and (5) after the treated articles are dried, they are heated at an elevated temperature below the decomposition temperature of the articles and the dried deposit thereon to provide further improvement in stain-resistance and oil and water repellence, and to make the dried deposit more resistant to removal by washing and dry cleaning. To illustrate the heating procedure just mentioned, the heating cycle may vary from 5 seconds at 500° F. to 20 minutes at 260° F. The heating can be conveniently carried out by means of an automatic clothes drier and/or by ironing the articles with a steam iron or a dry iron. This type of heating operation is sometimes referred to in the art as "curing" of the dried polymeric deposit on treated articles. It is not fully understood just how the heat treatment causes the enhancement of the properties of the treated product; but the coalescence of the dried deposit of the polymer composition is believed to be an important factor.

In addition to the exhaust method mentioned above, other methods known in the art can be employed for applying the liquid composition to the material to be treated; for example padding (i.e. dipping and squeezing), knife-coating, spraying, brushing and roller-coating methods can be used. Paper fibers and textile fibers can be treated by dispersing them in the composition before they are formed into sheets or fabrics.

The liquid composition of the present invention is useful for rendering materials oleophobic and hydrophobic which are initially wettable with the composition, including fabrics and yarns made from a wide variety of natural and synthetic fibers, as well as paper, felt, suede, leather and porous polymeric sheets and films, also painted and unpainted wood and metal. As explained above, the composition is adapted for easy and efficient treatment of various articles by means of ordinary household washing, drying and ironing equipment. Useful electrical insulation materials can be prepared by applying the novel composition to paper, cloth and the like.

The examples which follow are given for the purpose of illustrating the invention. All quantities shown are on a weight basis unless otherwise indicated.

EXAMPLE I

The stain-resistance and oil and water repellence of various fabric articles, including cotton tablecloths and polyester aprons are substantially improved by exhaust treatment in an automatic washer with a liquid composition of this invention. First, a concentrated dispersion is prepared according to the following formula:

COMPOSITION X

| | Percent by weight | |
|---|---|---|
| | Wet basis | Dry basis |
| Polymer (A) emulsion, 20% aqueous dispersion of fluorine-containing polymer | 9.65 | 20 |
| Polymer (B) emulsion, 50% aqueous dispersion of cationic polymer | 3.86 | 20 |
| Paraffin wax | 5.80 | 60 |
| Water | 80.69 | |
| Total | 100.00 | 100 |

The polymer (A) emulsion in composition (X) is prepared according to the procedure described in Example 1 of the above-mentioned copending U.S. patent application Ser. No. 505,241, filed Oct. 26, 1965 by M. Zanger, which procedure comprises reacting hexafluoropropylene oxide ("HFPO") dimer with hydroxyethyl methacrylate and emulsion polymerizing the resulting fluorine-containing ester to form the polymer. The resulting polymer has the structure which results from replacing with

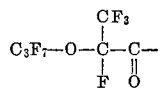

groups hydrogen atoms of the HO- groups of poly(hydroxyethyl methacrylate).

Polymer (B) in composition (X) is a copolymer of (1) 30 parts 2-(diethylamino) ethyl methacrylate and (2) 70 parts stearyl methacrylate. The emulsion of polymer (B) is prepared by (a) dispersing monomers (1) and (2) of the previous sentence in 200 parts of water containing 4 parts of trimethyloctadecylammonium chloride as dispersing agent, (b) carrying out the polymerization by heating for 4 hours at 65° C., under an atmosphere of nitrogen, adding 2 parts of 30% hydrogen peroxide as catalyst at the beginning of each hour of the 4 hours, (c) acidifying the resulting emulsion under vigorous agitation at 75° C. with glacial acetic to convert the polymer into its acetic acid salt, 5 parts of the acid being added per 100 parts of the emulsion.

In preparing composition (X), the wax is heated to the molten state and added slowly with vigorous stirring to the polymer (B) emulsion while the latter is at 75° C. Stirring is continued while the mixture is cooled and while the polymer (A) emulsion is added to the cooled mixture.

Sixteen ounces of composition (X) are poured into an automatic washing machine containing 10 gallons of water at 120° F. and 4 pounds of the cotton and polyester fabric articles. The weight ratio of the nonvolatile portion of composition (X) to the dry weight of articles in the washer is 2.5:97.5. The fabric articles are (a) agitated in the washing machine for 15 minutes, (b) spun until partially dry, (c) dried in an automatic clothes drier set to run for 50 minutes at 160° F. and (d) ironed with a steam iron set on medium heat.

The treated articles contain a dry deposit of the nonvolatile portion of composition (X). Before treatment, the articles readily absorbed oil and water and were easily stained when contacted with oily and aqueous materials (e.g. French dressing, catsup, chocolate milk, ink and coffee). After treatment, the articles are repellent to oil and water and are not easily stained when oily and aqueous materials are spilled thereon and then blotted off with a napkin made of absorbent paper or cloth.

EXAMPLE II

In three different experiments (a, b and c), similar results to those obtained in Example 1 are obtained when Example 1 is repeated except polymer (A) of Example 1 is replaced with a polymer prepared by reacting ("HFPO") dimer with:

(a) poly(vinyl alcohol)
(b) cellulose
(c) poly(ethylene imine)

EXAMPLE III

Results similar to those obtained in Example 1 are obtained when Example 1 is repeated except (a) composition (X) is replaced by composition (Y) in which the nonvolatile portion contains 40% by weight of an auxiliary polymer (copolymer of 2-ethyl hexylmethacrylate and N-methylol acrylamide) and (b) the weight ratio of the nonvolatile portion of composition (Y) to the dry weight of articles in the washer is 3:97. Composition (Y) has the following formula:

COMPOSITION Y

| | Percent by weight | |
|---|---|---|
| | Wet basis | Dry basis |
| Polymer (A) emulsion of Example 1 | 8.70 | 15.00 |
| Polymer (B) emulsion of Example 1 | 2.62 | 11.25 |
| Auxiliary polymer (polymer C) emulsion; 20% solids | 9.28 | 40.00 |
| Paraffin wax | 3.91 | 33.75 |
| Water | 75.49 | |
| Total | 100.00 | 100.00 |

The polymer (C) emulsion in composition (Y) is prepared by emulsion polymerization, using the following formula:

Composition Z

| | Parts by weight |
|---|---|
| Deaerated water | 2,200 |
| 2-ethylhexyl methacrylate | 1,000 |
| N-methylol acrylamide (60% aqueous solution) | 30 |
| Dimethyloctadecylamine | 20 |
| Glacial acetic acid | 12.2 |
| Sodium chloride | 0.7 |
| Acetone | 237 |
| Azodiisobutyramidine dihydrochloride | 0.222 |

The polymer (C) emulsion is prepared by (a) dissolving the emulsifying agent in the water, (b) dispersing the two monomers in the resulting solution, (c) adding the other ingredients with stirring and (d) carrying out the polymerization by heating for 4 hours at 70° C. under nitrogen.

After the wax is added to the polymer (B) emulsion as described in Example 1, stirring is continued while the mixture is cooled and while the polymer (C) emulsion and polymer (A) emulsion are added to the cooled mixture.

The dry deposit on the treated articles is even more resistant to removal by washing than that of Example 1.

In the description of the fluorine-containing polymer (A) given herein, R² is described as "a polymeric radical having a valence of $m$." Although this use of the term "valence" might not be exactly in accordance with some definitions of the term, the meaning intended herein will be clear to one skilled in the art. For example, it is apparent that polymer (A) has the structure which results from replacing with

groups the H atoms of all ($m$) or part ($p$) of the —XH groups of a polymer having the formula $(HX)_m$—$R^2$. Thus, the "valence of $m$" mentioned herein with respect to radical R² obviously has a value equal to the number of —XH groups originally present in the polymer from which radical R² is derived.

We claim:
1. As a new liquid composition adapted for rendering fabrics and other materials stain-resistant and repellent to oil and water, a dispersion in water of 100 parts by weight of nonvolatile components comprising:

(A) about 5 to 95 parts by weight of a fluorine-containing polymer having the structural formula $$(R^1-C(=O)-X)_p(HX)_{m-p}R^2$$

wherein $R^1$ is the radical

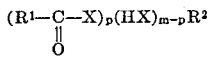

$C_3F_7$— being $F_3C$—$CF_2$—$CF_2$— or

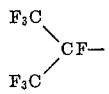

and $n$ being an integer of 0 to 6 inclusive; X is oxygen or nitrogen; $m$ and $p$ are integers of at least one, the $R^1$ radical content of the polymer is at least 40% by weight, and $R^2$ is a polymeric radical having a valence of $m$, and having the formula which results from removal of the H atoms from at least part of the —OH or —NH groups attached to the backbone of a polymer selected from the group consisting of poly(hydroxyalkylacrylates) and poly(hydroxyalkylmethacrylates) in which the alkyl group contains 1–8 carbon atoms, poly(vinyl alcohol), cellulose, and poly(ethylene imine); and (B) about 5 to 95 parts by weight of a cationic polymer containing interpolymerized units of: (1) a basic acrylic monomer of the formula

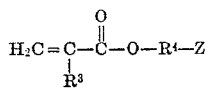

wherein $R^3$ is H or $CH_3$, $R^4$ is a 2–4 carbon atom alkylene radical or a radical of the formula

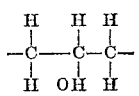

and Z is (a)

wherein $R^5$ is H or a 1–4 carbon atom alkyl radical and $R^6$ is a 1–22 carbon atom alkyl radical, or (b) a 5 or 6 membered heterocyclic radical having a secondary nitrogen atom; Z being present in ionizable salt or quaternary ammonium form, and (2) a neutral acrylic monomer of the formula

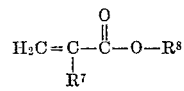

wherein $R^7$ is H or a 1–7 carbon atom alkyl radical and $R^8$ is a 1–22 carbon atom aliphatic hydrocarbon radical.

2. A composition according to claim 1 wherein $R^1$ of polymer (A) is the radical

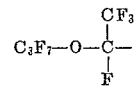

3. A composition according to claim 2 wherein the weight ratio of component (1) to component (2) of polymer (B) is about 20:80 to 80:20.

4. A composition according to claim 2 wherein polymer (B) is a copolymer of (1) 2-(diethylamino) ethyl methacrylate and (2) an alkyl methacrylate having 1–22 carbon atoms in the alkyl group, and the weight ratio of component (1) to component (2) is about 25:75 to 50:50.

5. A composition according to claim 3 wherein polymer (B) is also comprised of up to about 20% by weight of units from another neutral monoethylenically unsaturated monomer interpolymerized with components (1) and (2).

6. A composition according to claim 2 wherein the nonvolatile portion also contains about 3 to 80 parts by weight of an auxiliary polymer.

7. A composition according to claim 2 wherein the nonvolatile portion also contains about 5 to 80 parts by weight of a water-repellent wax.

8. As a new article of manufacture, a fabric or other material which is initially wettable with, and contains a dried deposit of, the liquid composition described in claim 1.

References Cited

UNITED STATES PATENTS

| | | | |
|---|---|---|---|
| 2,713,593 | 7/1955 | Brice et al. | 260—465.6 |
| 3,238,235 | 3/1966 | Hauptschein et al. | |
| 3,248,352 | 4/1966 | Marascia et al. | 260—28.5 |
| 3,277,039 | 10/1966 | Marascia et al. | |
| 3,102,103 | 8/1963 | Ahlbrecht et al. | 260—29.6 |

FOREIGN PATENTS

| | | |
|---|---|---|
| 1,359,426 | 3/1964 | France. |
| 915,759 | 1/1963 | Great Britain. |
| 919,324 | 2/1963 | Great Britain. |

ALLAN LIEBERMAN, *Primary Examiner.*

U.S. Cl. X.R.

117—139.5, 143, 148, 155; 260—28.5, 29.6, 900